United States Patent [19]

Scholz

[11] Patent Number: 4,725,921

[45] Date of Patent: Feb. 16, 1988

[54] HINGED LABELING PANEL

[75] Inventor: Bernd Scholz, Erlangen, Fed. Rep. of Germany

[73] Assignee: Siemens Aktiengesellschaft, Berlin and Munich, Fed. Rep. of Germany

[21] Appl. No.: 870,207

[22] Filed: Jun. 3, 1986

[30] Foreign Application Priority Data

Sep. 20, 1985 [DE] Fed. Rep. of Germany ... 8526947[U]

[51] Int. Cl.[4] ........................ H02B 1/04; A47B 63/00

[52] U.S. Cl. .................................... 361/392; 361/415; 312/320; 439/327; 292/209

[58] Field of Search ............... 312/234, 320 X; 211/4, 211/41 X; 439/327 X; 292/209; 361/331, 340, 391, 380, 392–395, 415, 417, 419, 426, 427, 399, 429; 16/225, 231, 232, 319, 333, 343

[56] References Cited

U.S. PATENT DOCUMENTS 3,228,740 1/1966 Lundell .............................. 312/320
4,002,381 1/1977 Wagner ................................ 211/41
4,580,192 4/1986 Beun .................................. 361/415

FOREIGN PATENT DOCUMENTS 1894755 11/1963 Fed. Rep. of Germany .

*Primary Examiner*—G. P. Tolin
*Attorney, Agent, or Firm*—James G. Morrow

[57] ABSTRACT

A hinge-mounted labeling panel having two final positions for use on plug-in modules in subassemblies of a mechanically modular system. According to the invention, a panel portion of the labeling panel is hinge-mounted on one end to a guide crossbar of the subassembly, such as a card cage, and on the other end is fitted with a lock. The labeling panel thus has a simple design, and also has two flat sides both of which can be used to attach the desired labeling.

11 Claims, 3 Drawing Figures

HINGED LABELING PANEL

FIELD OF INVENTION

This invention relates to a hinged labeling panel with two end settings for the plug-in modules in a subassembly of a mechanical modular system.

BACKGROUND OF THE INVENTION

One type of labeling panel is known from Federal Republic of Germany Gebrauchsmuster No. 1,894,755. In this known design there are two longitudinal ribs for reinforcement on the back side of the panel which consists of a profiled bar. Pins are inserted at the ends of the longitudinal ribs, lying parallel to the panel. Said pins slide into vertical slots, which, in turn, are positioned in a part of the mounting frame. Thus, the panel can be swivelled in a vertical direction to either of two end settings so that in the lower end setting the panel's lower edge grips the upper edge of the row of plug-in modules which are to be held in place, while in its upper end setting the panel releases the upper edges. In order to be able to fasten the panel in both end settings, the lower slot of the two slots has a reinforced design, and a corresponding pin, which mates with one of the longitudinal ribs, is held in place by a spring in one of the two end settings.

SUMMARY OF THE INVENTION

It is the object of this invention to develop a labeling panel of simple design whose flat sides can serve to mount all the identification labeling required for both assembly and maintenance. It is a further object of the invention to provide the plug-in modules with means to be secured against unauthorized access in a simple fashion.

Briefly stated in accordance with one aspect of the invention the foregoing objects are achieved by providing a hinge-mount labeling panel apparatus with two final positions, for plug-in modules, such as printed circuit boards; of subassemblies, such as card cages, having an upper and a lower crossbar with guide openings therein of a mechanically modular system. This apparatus comprises a panel portion, a hinge portion affixed to one end of said panel portion and hinge-mounted to one of said crossbars, and a lock portion on another end of said panel portion for locking onto said plug-in module.

In the labeling panel in accordance with this embodiment of the invention for plug-in modules, the panel section of the labeling panel is fastened in a hinged fashion on one side to a crossbar of the subassembly and fitted with a locking mechanism on the other side. Due to the single-point hinge mounting of the panel to the crossbar of the subassembly, both flat sides of the panel can be used to mount the required labeling. The flat side facing the plug-in modules, thus the flat side of the panel which is visible when the labeling panel is in its unlocked position, can be fitted with labels identifying the locations of the individual plug-in modules in the subassembly. The flat side of the panel, which is visible when the description panel is in the locked position, can be used for the type designation of the modules. Moreover, this provides a very simple design of the labeling panel, with both the lock and the hinge forming an integral component of the panel itself.

The hinge in said design is a flexible profile section characterized by an elongation bead, whose connecting device lies up against the crossbar. Thereby the bending characteristics of the hinge can be adjusted within wide parameters to the respective requirements. By using said flexible profiles and the elongation bead, any desired spring force can be exerted on the plug-in and disconnect aid mechanisms of the plug-in modules to be held in place.

In another preferred embodiment the fastening device of the hinge is fitted with a web fin, which is set in the direction of the crossbar alignment opening pointing away from the plug-in plane of the plug-in module. Thereby, in the unlocked position of the labeling panel, the plug-in modules can be pulled out from the subassembly without hindrance.

In a third preferred embodiment the fastening mechanisms of the hinge and of the panel are materially connected to the hinge. Thus, the labeling panel can be fabricated in an extrusion process. A polyurethane elastomer can be used as the hinge material, and a hard plastic can be used as the panel or fastening mechanism material.

In a further preferred embodiment the lock exerts a spring action when closing the labeling panel into its locked position. In order to fix thelock, a locking element is provided which in a simple fashion prevents any self-opening of the labeling panel. For easier bolting of the labeling panel, the locking element is designed with a starting catch whose incline is determined by the levers of the plug-in and disconnect aids used inthe plug-in modules. Similarly, the opening of the labeling panel is simplified by means of the starting catch.

In a yet further preferred embodiment, the hinge section facing the labeling panel is constricted. Thereby, aside from the elongation bead of the flexible profile section, an additional preset expansion range is determined. Moreover, this assures that in the locked position of the labeling panel, the hinge comes flush with the levers of the plug-in and disconnect aids of the plug-in modules to be held in place.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 1:
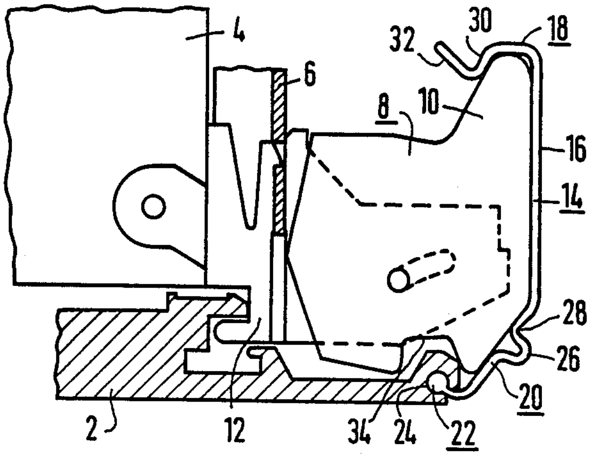
FIG. 1 shows a labeling panel in accordance with the invention in its locked position.

The depiction in FIG. 1 shows a section of a subassembly, wherein for purposes of clarity only the lower crossbar 2 is depicted. The subassembly serves to mount plug-in modules 4 which consist of p.c. boards of structural and contact elements fitted with a frontal panel 6 facing towards the front of the subassembly. Plug-in module 4 is equipped at the lower end of frontal panel 6 with a plug-in and disconnect aid mechanism 8 which comprises a lever 10 and an end piece 12. It also shows a labeling panel 14 consisting of a panel 16, a lock mechanism 18, and a hinge 20. The flat side of panel 16 of the labeling panel 14 facing away from the plug-in module 4 is used for the labeling which bears the designation of this subassembly section or other information such as the company logo. Panel 16, which can extend over the entire length of the subassembly, is hinge-mounted on one side by means of hinge 20 to crossbar 2 of the subassembly, with a fastening mechanism 22 of hinge 20 being hinge-mounted in a guide 24 of crossbar 2. A flexible profiled section fitted with an elongation bead 26 is used as the hinge 20. Moreover, the section of the hinge 20 facing the panel 16 is provided with a constriction 28. Thereby, aside from elongation bead 26, a further expansion area is determined at a preset point of hinge 20. Lock 18 is installed integrally at the side of panel 16 facing away from hinge 20. Moreover, lock 18 has a lock element 30 to hold the lock in place and prevent any self-opening of labeling panel 14. To simplify closing of the labeling panel 14, lock element 30 has a starting catch 32. The latter also simplifies opening of the labeling panel 14. Moreover, a wire can be run in the groove formed along keyway 34 of the plug-in and disconnect aid mechanism 8 and from the starting catch 32 and lock element 30, with the wire ends being soldered directly together or enclosing part of the subassembly. Thereby, the plug-in modules 4 can be mechanically soldered together for shipping purposes. The soldered wire will also act as a seal which prevents unauthorized persons having unnoticed access to the individual plug-in modules 4.

Figure 2:
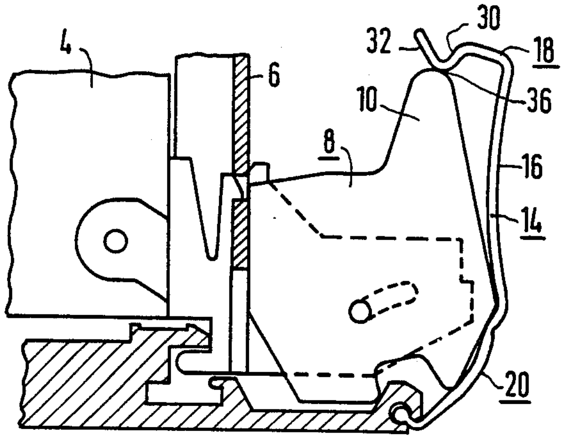
FIG. 2 shows the labeling panel when opening or closing.

FIG. 2 shows the labeling panel when opening or closing. In said position hinge 20, which is made of a poolyurethane elastomer, is fully extended or elongated while projection 36 of lock 18 consisting of lock element 30 and starting catch 32 is supported by lever 10 of the plug-in and disconnect aid mechanism 8. By means of the polyurethane elastomer and the elongation bead 26, which is not noticeable in this position of labeling panel 14, any desired spring forces can be achieved. Moreover, lever 10 of the plug-in and disconnect aid mechanism 8 also determines the configuration of elongation bead 26. At a given spring force of the material and elongation bead 26, the labeling panel 14 can be self-closing in that the spring force of the material will urge the labeling panel 14 into a closed position as illustrated in FIG. 1. When closing labeling panel 14, starting catch 32 is supported on that portion of lever 10 which faces panel 16. Thereby, the force to be exerted when closing labeling panel 14 is substantially reduced. When opening labeling panel 14, one reaches behind the starting catch 32 and pulls labeling panel 14 away from the frontal panel 6 of plug-in module 4 so that projection 36 of lock 18 can support itself against lever 10.

Figure 3:
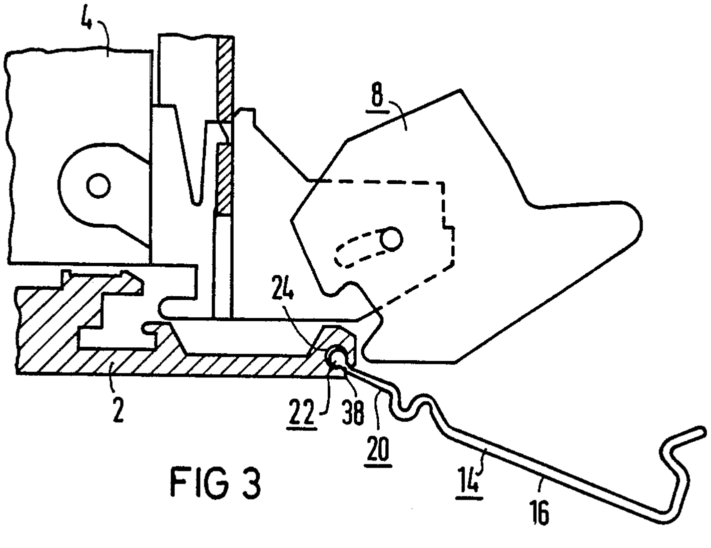
FIG. 3 shows the labeling panel in the unlocked position.

FIG. 3 shows the labeling panel 14 in its unlocked position. In this position, labeling panel 14 has been swivelled far enough away from the plug-in plane of plug-in modules 4 so that the plug-in and disconnect aid mechanism can be activated without hindrance and plug-in module 4 thereby removed easily from the subassembly. The flat side of panel 16 of labeling panel 14, which can be seen in said unlocked position, can be labeled to designate the individual plug-in modules 4 of the subassembly. Thus, any mixup of plug-in modules 4 when assembling the subassembly can be avoided. Said final position of labeling panel 14 is implemented by having the fastening device 22 of hinge 20 equipped with a web 38 aligned in the direction of the opening of guide rail 24 of crossbar 2 facing away from the plug-in plane of plug-in modules 4, with a hard plastic being used as the material. The fastening mechanism 22 is also connected to hinge 20 in a solid fashion as is panel 16. Moreover, fastening device 22 is mounted in a reliably swivelling fashion in guide rail 24 of crossbar 2.

It will now be understood that there has been disclosed an improved apparatus for labeling plug-in modules of card cage subassemblies. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A hinge-mounted labeling panel component locking a plug-in module of a subassembly in place, the plug-in module including a disconnect aid mechanism and the subassembly including at least one crossbar with a guide opening, the hinge-mounted labeling panel component comprising:
- a first end and a second end;
- a panel portion between the first end and the second end;
- a flexible profile section;
- a hinge portion on the first end of the hinge-mounted labeling panel mounted to the crossbar at the guide opening; and
- a lock portion on the second end of the hinge-mounted labeling panel removably locking onto the disconnect aid mechanism of the plug-in module; said flexible profile section elongating as the lock portion is locked onto the disconnect aid mechanism.

2. A hinge-mounted labeling panel component according to claim 1, further comprising:
- a fastening mechanism connected at the end of said flexible profile section which is captively inserted into the crossbar guide opening, wherein the flexible profile section includes an elongation bead as a part thereof.

3. A hinge-mounted labeling panel component according to claim 2, further comprising a web aligned in the direction of the guide opening of the crossbar connecting said fastening mechanism to said hinge portion.

4. A hinge-mounted labeling panel component according to claim 2, wherein said fastening mechanism and said panel portion are always solidly connected to the hinge portion.

5. A hinge-mounted labeling panel component according to claim 4, wherein said hinge portion is constructed of a polyurethane elastomer.

6. A hinge-mounted labeling panel component according to claim 2, wherein a lock element is connected to said lock portion to secure said lock portion in the locked position.

7. A hinge-mounted labeling panel component according to claim 6, wherein said lock portion is self-locking.

8. A hinge-mounted labeling panel component according to claim 6, wherein said lock element is a snap lock.

9. A hinge-mounted labeling panel component according to claim 6, wherein said lock element has a starting catch connected to one end thereof.

10. A hinge-mounted labeling panel component according to claim 1, further comprising a constriction portion connecting said hinge portion to said panel portion.

11. A hinge-mounted labeling panel component according to claim 2, further comprising a constriction portion connecting said hinge portion to said panel portion.

* * * * *